US008304069B2

(12) United States Patent
Gehringer et al.

(10) Patent No.: US 8,304,069 B2
(45) **Date of Patent: *Nov. 6, 2012**

(54) LIGHT WOOD-BASED MATERIALS

(75) Inventors: Lionel Gehringer, Scheibenhard (FR); Stephan Weinkötz, Neustadt (DE); Günter Scherr, Ludwigshafen (DE); Frank Braun, Ludwigshafen (DE); Maxim Peretolchin, Mannheim (DE)

(73) Assignee: BASF SE, Ludwigshafen (DE)

( * ) Notice: Subject to any disclaimer, the term of this patent is extended or adjusted under 35 U.S.C. 154(b) by 604 days.

This patent is subject to a terminal disclaimer.

(21) Appl. No.: 12/446,245

(22) PCT Filed: Oct. 18, 2007

(86) PCT No.: PCT/EP2007/061165

§ 371 (c)(1),
(2), (4) Date: May 28, 2009

(87) PCT Pub. No.: WO2008/046890

PCT Pub. Date: Apr. 24, 2008

(65) Prior Publication Data

US 2010/0297425 A1 Nov. 25, 2010

(30) Foreign Application Priority Data

Oct. 19, 2006 (EP) .................................... 06122557

(51) Int. Cl.
*B32B 5/16* (2006.01)

(52) U.S. Cl. ........ 428/323; 428/326; 428/327; 428/403; 428/532; 428/534; 428/535; 428/537.1

(58) Field of Classification Search .................. 428/323, 428/326, 327, 403, 532, 534, 535, 537.1
See application file for complete search history.

(56) References Cited

U.S. PATENT DOCUMENTS

| | | | | |
|---|---|---|---|---|
| 4,513,105 | A | 4/1985 | Hahn et al. | |
| 4,525,484 | A | 6/1985 | Hahn et al. | |
| 5,002,713 | A * | 3/1991 | Palardy et al. | 264/109 |
| 5,104,903 | A | 4/1992 | Hahn et al. | |
| 5,554,429 | A * | 9/1996 | Iwata et al. | 428/105 |
| 6,340,713 | B1 | 1/2002 | Glueck et al. | |
| 2003/0024443 | A1 | 2/2003 | Hoshi | |
| 2005/0019548 | A1* | 1/2005 | Liu et al. | 428/313.5 |
| 2010/0190021 | A1 | 7/2010 | Ruba et al. | |
| 2011/0003136 | A1 | 1/2011 | Schmidt et al. | |
| 2011/0039090 | A1 | 2/2011 | Weinkotz et al. | |

FOREIGN PATENT DOCUMENTS

| | | | | |
|---|---|---|---|---|
| CH | 370229 | | | 8/1963 |
| DE | 845264 | | | 8/1952 |
| DE | 370229 | A | * | 6/1963 |
| DE | 3921148 | A1 | | 1/1991 |
| EP | 0106129 | A2 | | 4/1984 |
| EP | 0981574 | B1 | | 9/2000 |
| JP | 06031708 | A | | 2/1994 |
| WO | WO02/38676 | | * | 5/2002 |
| WO | WO-02/38676 | A1 | | 5/2002 |
| WO | WO 2008/046892 | | | 4/2008 |

OTHER PUBLICATIONS

Office action mailed Feb. 16, 2011 in U.S. Appl. No. 12/679,181.
U.S. Appl. No. 12/446,248, filed Apr. 20, 2009.

* cited by examiner

*Primary Examiner* — Leszek Kiliman
(74) *Attorney, Agent, or Firm* — Connolly Bove Lodge & Hutz LLP

(57) ABSTRACT

The present invention relates to light wood-base materials comprising from 30 to 92.5% by weight, based on the wood-base material, of wood particles, the wood particles having a mean density of from 0.4 to 0.85 g/$cm^3$, from 2.5 to 20% by weight, based on the wood-base material, of polystyrene and/or of styrene copolymer as a filler, the filler having a bulk density of from 10 to 100 kg/$m^3$, and from 5 to 50% by weight, based on the wood-base material, of a binder, the mean density of the light wood-base material being less than or equal to 600 kg/$m^3$.

13 Claims, No Drawings

LIGHT WOOD-BASED MATERIALS

CROSS-REFERENCE TO RELATED APPLICATIONS

This application is a national stage application (under 35 U.S.C. §371) of PCT/EP2007/061165, filed Oct. 18, 2007, which claims benefit of European application 06122557.9, filed Oct. 19, 2006.

BACKGROUND OF THE INVENTION

The present invention relates to light wood-base materials comprising from 30 to 95% by weight, based on the wood-base material, of wood particles, the wood particles having a mean density of from 0.4 to 0.85 g/cm$^3$, from 2.5 to 20% by weight, based on the wood-base material, of polystyrene and/or of styrene copolymer as a filler, the filler having a bulk density of from 10 to 100 kg/m$^3$, and from 2.5 to 50% by weight, based on the wood-base material, of a binder, the mean density of the light wood-base material being less than or equal to 600 kg/m$^3$.

Wood-base materials constitute an economical and resource-saving alternative to solid wood and are very important particularly in furniture construction, in laminate floors and as building materials. Wood particles of different thickness, e.g. wood chips or wood fibers from various timbers, serve as starting materials. Such wood particles are usually pressed with natural and/or synthetic binders and, if appropriate, with addition of further additives to give board-like or strand-like wood-base materials.

The industrial demand for light wood-base materials has increased steadily in recent years, in particular since take-away furniture has gained in popularity, i.e. the cash payment and self-collection of furniture by the end customer. Furthermore, the increasing oil price which leads to a continual increase in, for example, the transport costs, has given rise to a greater interest in light wood-base materials.

In summary, light wood-base materials are of considerable importance for the following reasons:

Light wood-base materials lead to simpler handling of the products by the end customers, for example in packing, transporting, unpacking or assembly of the furniture. Light wood-base materials lead to lower transport and packaging costs; furthermore, material costs can be reduced in the production of light wood-base materials. For example, when used in means of transport, light wood-base materials can lead to lower energy consumption of these means of transport. Furthermore, with the use of light wood-base materials, for example, material-consumptive decorative parts, such as thicker worktops and side panels in the kitchen, which are currently fashionable, can be offered more economically.

The prior art includes a wide range of proposals for reducing the density of the wood-base materials.

For example, tubular particle boards and honeycomb boards may be mentioned as light (wood-base) materials. Owing to their particular properties, tubular particle boards are used mainly as an inner layer in the production of doors. Disadvantages of these materials are the insufficient resistance to screw extraction, the complicated fixing of fittings and the difficulties in edging.

Furthermore, the prior art includes proposals for reducing the density of wood-base materials by additives to the glue or to the wood particles.

CH 370229 describes light and simultaneously pressure-resistant compression-molded materials which consist of woodchips or fibers, a binder and a porous plastic serving as a filler. For the production of the compression-molded materials, the woodchips or fibers are mixed with a binder and foamable or partly foamable plastics, and the mixture obtained is molded at elevated temperature. Binders which may be used are all conventional binders suitable for the gluing of wood, such as, for example, urea-formaldehyde resins. Suitable fillers are foamable or already foamed plastic particles, preferably expandable thermoplastics, such as styrene polymers. The particle size of the plastics used is in general from 0.6 to 10 mm in the case of prefoamed plastics. The plastics are used in an amount of from 0.5 to 5% by weight, based on the woodchips. The boards described in the examples have a density of from 220 kg/m$^3$ to 430 kg/m$^3$ and a mean flexural strength of from 3.6 N/mm$^2$ to 17.7 N/mm$^2$ at a thickness of from 18 to 21 mm. The transverse tensile strengths are not stated in the examples.

WO 02/38676 describes a process for the production of light products in which from 5 to 40% by weight of foamable or already foamed polystyrene having a particle size of less than 1 mm, from 60 to 95% by weight of lignocellulose-containing material and binder are mixed and are molded at elevated temperature and elevated pressure to give the finished product, the polystyrene melting and firstly impregnating the lignocellulose-containing material and secondly by migration to the surface of the product, forming a hard, water-resistant skin. The binder used may be, inter alis, urea-formaldehyde resin or melamine-formaldehyde resin. In the example, a product having a thickness of 4.5 mm and a density of 1200 kg/m$^3$ is described.

US 2005/0019548 describes light OSB boards with the use of fillers having a low density. Binders described are polymeric binders, for example, diphenylmethane 4,4-diisocyanate resin. Fillers described are glass, ceramic, perlite and polymeric materials. The polymeric material is used in an amount of from 0.8 to 20% by weight, based on the OSB board. The material Dualite, which consists of polypropylene, polyvinylidene chloride or polyacrylonitrile, is used as polymeric material in the examples. A weight reduction of 5% is described. In the examples, OSB boards having a density of from 607 to 677 kg/m$^3$ and a transverse tensile strength of from 0.31 to 0.59 N/mm$^2$ are described.

US 2003124443 discloses a material which consists of woodchips, binder and fillers. Fillers mentioned are, inter alia, polymers based on styrene. The volume ratio of the woodchips to the binder is advantageously 1:1. Furthermore, boards from the prior art are described in which the volume ratio of binder to woodchips is 90:10. These boards from the prior art have a density of 948 kg/m$^3$. Binders described are, inter alia, thermosetting resins. Examples according to the invention describe boards which have a volume ratio of binder to woodchips of 45:55 and a density of 887 kg/m$^3$.

JP 06031708 describes light wood-base materials, a mixture of 100 parts by weight of wood particles and from 5 to 30 parts by weight of particles of synthetic resin foam being used for the middle layer of a three-layer particle board, these resin particles having a density of not more than 0.3 g/cm$^3$ and a compressive strength of at least 30 kg/cm$^2$. It is furthermore stated that the specific density of the wood particles should not exceed a value of 0.5 g/cm$^3$.

In the examples, a mechanical strength of the wood-base materials produced of from 4.7 to 4.9 kg/cm$^3$ is achieved with the use of wood particles from Japanese cedar having a density of 0.35 g/cm$^3$. With the use of lauan and kapur wood particles having a mean density of 0.6 g/cm$^3$, it was possible to achieve only a mechanical strength of the wood-base materials produced of 3.7 kg/cm$^3$.

In summary, the disadvantage of the prior art is that firstly the light (wood-base) materials described have insufficient mechanical strengths for furniture production, such as, for example, insufficient resistance to screw extraction. Secondly, the wood-base materials described in the prior art still have a high density of not more than 600 kg/$m^3$. Furthermore, timbers having a density of less than 0.5 g/$cm^3$ which is unusually light for the European market, are used in the prior art for the production of light wood-base materials.

Insufficient mechanical strength can lead, for example, to breaking or tearing of the components. Furthermore, these components tend to exhibit additional flaking off from further wood material on drilling or sawing. In the case of these materials, the fastening of fittings is more difficult.

BRIEF SUMMARY OF THE INVENTION

It was accordingly the object of the present invention to provide light wood-base materials which have a density which is from 5 to 40% lower compared with the commercially available wood-base materials and constant good mechanical strengths. The mechanical strength can be determined, for example, by measuring the transverse tensile strength. Furthermore, the light wood-base materials should be capable of being produced using domestic, European timbers. Consequently, the light wood-base materials with the use of heavy timbers having a density greater than or equal to 0.5 g/$cm^3$ should have low densities and high mechanical strengths comparable in each case to the wood-base materials according to JP 06031708, which were produced using light timbers. Furthermore, the swelling value and the water absorption of the light wood-base materials should not be adversely affected by the reduced density.

The object was achieved by the light wood-base materials comprising from 30 to 95% by weight, based on the wood-base material, of wood particles, the wood particles having a mean density of from 0.4 to 0.85 g/$cm^3$, from 2.5 to 20% by weight, based on the wood-base material, of polystyrene and/or of styrene copolymer as a filler, the filler having a bulk density of from 10 to 100 kg/$m^3$, and from 2.5 to 50% by weight, based on the wood-base material, of a binder, the mean density of the light wood-base material being less than or equal to 600 kg/$m^3$.

DETAILED DESCRIPTION OF THE INVENTION

The invention is related to a light wood-base material comprising

- from 30 to 92.5% by weight, based on the wood-base material, of wood particles, the wood particles having a mean density of from 0.4 to 0.85 g/$cm^3$,
- from 2.5 to 20% by weight, based on the wood-base material, of polystyrene and/or of styrene copolymer as a filler, the filler having a bulk density of from 10 to 100 kg/$m^3$, and
- from 5 to 50% by weight, based on the wood-base material, of a binder, the mean density of the light wood-base material being less than or equal to 600 kg/$m^3$.

The stated weight of the binder is based on the solids content of the binder. The mean density of the wood particle is based on a wood moisture content of 12%. Furthermore, the mean density of the wood particles is based on an average density over all wood particles used.

Advantageously, the wood-base materials according to the invention have a mean density of from 200 to 600 kg/$m^3$, preferably from 200 to 575 kg/$m^3$, particularly preferably from 250 to 550 kg/$m^3$, in particular from 300 to 500 kg/$m^3$.

The transverse tensile strength of the wood-base materials according to the invention is advantageously greater than 0.3 N/$mm^2$, preferably greater than 0.4 N/$mm^2$, particularly preferably greater than 0.5 and in particular greater than 0.6 N/$mm^2$. The determination of the transverse tensile strength is effected according to EN 319.

Suitable wood-base materials are all materials which are produced from wood veneers having a mean density of from 0.4 to 0.85 g/$cm^3$, such as, for example, veneer boards or plywood boards, wood-base materials produced from woodchips having a mean density of from 0.4 to 0.85 g/$cm^3$, for example particle boards, or OSB boards, and wood-fiber materials, such as LDF, MDF and HDF boards. Particle boards and fiberboards are preferred, in particular particle boards.

The mean density of the wood particles is advantageously from 0.4 to 0.8 g/$cm^3$, preferably from 0.4 to 0.75 g/$cm^3$, in particular from 0.4 to 0.6 g/$cm^3$.

For example, spruce, beech, pine, larch or fir wood, preferably spruce and/or beech wood, in particular spruce wood, is used for the production of the wood particles.

The filler polystyrene and/or styrene copolymer can be prepared by all polymerization processes known to the person skilled in the art [cf. for example Ullmann's Encyclopedia, Sixth Edition, 2000 Electronic Release]. For example, preparation is effected in a manner known per se by suspension polymerization or by means of extrusion processes.

In the suspension polymerization, styrene, if appropriate with addition of further comonomers, is polymerized in aqueous suspension in the presence of a conventional suspension stabilizer by means of catalysts which form free radicals. The blowing agent and, if appropriate, further additives can be initially taken together in the polymerization or added to the batch in the course of the polymerization or after polymerization is complete. The bead-like styrene polymers obtained, which, if appropriate, are expandable, are separated from the aqueous phase after polymerization is complete, washed, dried and sieved.

In the extrusion process, the blowing agent is mixed into the polymer, for example, via an extruder, transported through a die plate and granulated to give particles or strands.

The filler polystyrene or styrene copolymer is particularly preferably expandable.

Blowing agents which may be used are all blowing agents known to the person skilled in the art, for example $C_3$- to $C_6$-hydrocarbons, such as propane, n-butane, isobutane, n-pentane, isopentane, neopentane and/or hexane, alcohols, ketones, ethers or halogenated hydrocarbons. A commercially available pentane isomer mixture is preferably used.

Furthermore, additives, nucleating agents, plasticizers, flameproofing agents, soluble and insoluble inorganic and/or organic dyes and pigments, e.g. IR absorbers, such as carbon black, graphite or aluminum powder, may be added to the styrene polymers, together or spatially separately as additives.

If appropriate, styrene copolymers may also be used; advantageously, these styrene copolymers comprise at least 50% by weight, preferably at lest 80% by weight, of polystyrene incorporated in the form of polymerized units. Suitable comonomers are, for example, α-methylstyrene, styrenes halogenated on the nucleus, acrylonitrile, esters of acrylic or methacrylic acid with alcohols having 1 to 8 carbon atoms, N-vinylcarbazole, maleic acid (anhydride), (meth)acrylamide and/or vinyl acetate.

Advantageously, the polystyrene and/or styrene copolymer may comprise a small amount of a chain-branching agent incorporated in the form of polymerized units, i.e. a compound having more than one double bond, preferably two double bonds, such as divinylbenzene, butadiene and/or butanediol diacrylate. The branching agent is used in general in amounts of from 0.005 to 0.05 mol % based on styrene. Advantageously, styrene (co)polymers having molecular weights and molecular weight distributions as described in EP-B 106 129 and in DE-A 39 21 148 are used. Styrene (co)polymers having a molecular weight in the range from 190 000 to 400 000 g/mol are preferably used.

It is also possible to use mixtures of different styrene (co) polymers.

Preferably used styrene polymers are crystal clear polystyrene (GPPS), high impact polystyrene, (HIPS), anionically polymerized polystyrene or high-impact polystyrene (A-IPS), styrene-α-methylstyrene copolymers, acrylonitrile-butadiene-styrene polymers (ABS), styrene-acrylonitrile (SAN), acrylonitrile-styrene-acrylate (ASA), methyl acrylate-butadiene-styrene (MBS), methyl methacrylate-acrylonitrile-butadiene-styrene (MARS) polymers or mixtures thereof or with polyphenylene ether (PPE).

Styropor®, Neopor® and/or Peripor® from BASF Aktiengesellschaft is particularly preferably used as the polystyrene.

Advantageously, prefoamed polystyrene and/or styrene copolymers are used. In general, the prefoamed polystyrene can be prepared by all processes known to the person skilled in the art (for example DE 845264). For the preparation of prefoamed polystyrene and/or styrene copolymers, the expandable styrene polymers are expanded in a known manner by heating to temperatures above their softening point, for example with hot air or preferably steam.

The prefoamed polystyrene or styrene copolymer advantageously has a bulk density of from 10 to 100 kg/m$^3$, preferably from 15 to 80 kg/m$^3$, particularly preferably from 20 to 70 kg/m$^3$, in particular from 30 to 60 kg/m$^3$.

The prefoamed polystyrene or styrene copolymer is advantageously used in the form of spheres or beads having a mean diameter of, advantageously, from 0.25 to 10 mm, preferably from 0.5 to 5 mm, in particular from 0.75 to 3 mm.

The prefoamed polystyrene or styrene copolymer spheres advantageously have a small surface area per volume, for example in the form of a spherical or elliptical particle.

The prefoamed polystyrene or styrene copolymer spheres are advantageously closed-cell. The proportion of open cells according to DIN-ISO 4590 is less than 30%.

Particularly preferably, the (prefoamed) polystyrene or styrene copolymer has an antistatic coating.

The customary substances usual in the industry can be used as an antistatic agent. Examples are N,N-bis(2-hydroxyethyl)-$C_{12}$-$C_{18}$-alkylamines, fatty acid diethanolamides, choline ester chlorides of fatty acids, $C_{12}$-$C_{20}$-alkylsulfonates and ammonium salts.

In addition to alkyl groups, suitable ammonium salts comprise, on the nitrogen, from 1 to 3 organic radicals containing hydroxyl groups.

Suitable quaternary ammonium salts are, for example, those which comprise, bonded to the nitrogen cation, from 1 to 3, preferably 2, identical or different alkyl radicals having 1 to 12, preferably 1 to 10, carbon atoms and from 1 to 3, preferably 2, identical or different hydroxyalkyl or hydroxyalkylpolyoxyalkylene radicals, with any desired anion, such as chloride, bromide, acetate, methylsufate or p-toluene sulfonate.

The hydroxyalkyl and hydroxyalkyl polyoxyalkylene radicals are those which form by oxyalkylation of a nitrogen-bonded hydrogen atom and are derived from 1 to 10 oxyalkylene radicals, in particular oxyethylene and oxypropylene radicals.

A particularly preferably used antistatic agent is a quaternary ammonium salt or an alkali metal salt, in particular sodium salt of a $C_{12}$-$C_{20}$-alkanesulfonate, e.g. emulsifier K30 from Bayer AG or mixtures thereof. The antistatic agent can be added as a rule both as a pure substance and in the form of an aqueous solution.

In the process for the preparation of polystyrene or styrene copolymer, the antistatic agent can be added analogously to the conventional additives or applied as a coating after the preparation of the polystyrene particles.

The antistatic agent is advantageously used in an amount of from 0.05 to 6% by weight, preferably from 0.1 to 4% by weight, based on the polystyrene or styrene copolymer.

The filler polystyrene and/or styrene copolymer is advantageously present uniformly distributed in the wood-base material according to the invention.

The filler spheres are advantageously present even after the molding of the wood-base material in a non-molten state. If appropriate, however, melting of the filler spheres which are present on the surface of the wood-base material may occur.

All binders known to the person skilled in the art for the production of wood-base materials may be used as the binder. Advantageously, formaldehyde-containing adhesives are used as binders, for example urea-formaldehyde resins or melamine-containing urea-formaldehyde resins. Urea-formaldehyde resins are preferably used. For example, Kaurit® glue from BASF Aktiengesellschaft is used as the binder.

The solids content of the binder is usually from 25 to 100% by weight, in particular from 50 to 70% by weight.

The light wood-base materials according to the invention comprise advantageously from 55 to 92.5% by weight, preferably from 60 to 90% by weight, in particular from 70 to 85% by weight, based on the wood-base material, of wood particles, the wood particles having a mean density of from 0.4 to 0.85 g/cm$^3$, preferably from 0.4 to 0.75 g/cm$^3$, in particular from 0.4 to 0.6 g/cm$^3$, from 5 to 15% by weight, preferably from 8 to 12% by weight, based on the wood-base material, of polystyrene and/or of styrene copolymer filler, the filler having a bulk density of from 10 to 100 kg/m$^3$, preferably from 20 to 80, in particular from 30 to 60, and from 2.5 to 40% by weight, preferably from 5 to 25% by weight, in particular from 5 to 15% by weight, based on the wood-base material, of a binder, the mean density of the light wood-base material being less than or equal to 600 kg/m$^3$, preferably less than or equal to 575 kg/m$^3$, in particular less than or equal to 550 kg/m$^3$.

All stated weights are based on the dry substance.

If appropriate, further additives which are commercially available and known to the person skilled in the art may be present in the wood-base material according to the invention.

The thickness of the wood-base materials varies with the field of use and is as a rule in the range from 0.5 to 50 mm.

The transverse tensile strength of the light wood-base materials according to the invention having a density of from 200 to 650 kg/m, is advantageously greater than (0.002×D-0.55) N/mm$^2$, preferably greater than (0.002×D-0.45) N/mm$^2$, in particular greater than (0.0022×D-0.45) N/mm$^2$, The swelling values are advantageously 10% less, preferably 20% less, in particular 30% less, than the swelling values of a board of the same density without filler.

Furthermore, the present invention relates to a material which comprises at least three layers, at least the middles layer(s) comprising from 30 to 95% by weight, based on the wood-base material, of wood particles, the wood particles having a mean density of from 0.4 to 0.85 g/cm$^3$, from 2.5 to 20% by weight, based on the wood-base material, of polystyrene and/or of styrene copolymer as a filler, the filler having a bulk density of from 10 to 100 kg/m$^3$, and from 2.5 to 50% by weight, based on the wood-base material, of a binder, the mean density of the light wood-base material being less than or equal to 600 kg/m$^3$.

Advantageously, the outer layers have no fillers.

Advantageously, the material comprises three layers, the outer layers together accounting for from 5 to 50 percent of the total thickness of the composite material, preferably from 15 to 45 percent, in particular from 30 to 40 percent, and the middle layer advantageously accounting for from 50 to 95 percent of the total thickness of the composite material, preferably from 55 to 85 percent, in particular from 60 to 70 percent.

Furthermore, the present invention relates to a process for the production of light wood-base materials, wherein prefoamed polystyrene and/or styrene copolymers having a bulk density of from 10 to 100 kg/m$^3$, binder and wood particles having a density of from 0.4 to 0.85 g/cm$^3$, are mixed and are then molded at elevated temperature and elevated pressure to give a wood-base material.

Preferably, the (prefoamed) polystyrene and/or styrene copolymer is provided with an antistatic coating before mixing with the binder and/or the wood particles.

If appropriate, the wood particle cake is precompacted at room temperature prior to molding. The molding can be effected by all processes known to the person skilled in the art. Usually, the wood particle cake is pressed at a pressing temperature of from 150° C. to 230° C. to the desired thickness. The duration of pressing is usually from 3 to 15 seconds per mm board thickness.

Furthermore, the present invention relates to the use of the wood-base materials according to the invention for the production of pieces of furniture, of packaging materials, in house construction or in interior trim.

The advantages of the present invention are the low density of the wood-base materials according to the invention in combination with good mechanical stability. Furthermore, the wood-base materials according to the invention can be easily produced; there is no need to convert the existing plants for the production of the wood-base materials according to the invention.

EXAMPLES

A) Preparation of the Fillers

A1.1) Preparation of Foamable Polystyrene with Antistatic Agent

Commercially available foamable polystyrenes which are summarized in table 1 are used.

A1.2) Preparation of Foamable Polystyrene without Antistatic Agent

Foamable polystyrene was prepared as described, for example, in EP 981 574. The addition of an antistatic agent during or after the preparation was dispensed with.

A2) Preparation of the Prefoamed Polystyrene

The polystyrene particles obtained according to example A1 were treated with steam in a continuous prefoamer. The bulk density of the prefoamed polystyrene spheres was adjusted by varying the steam pressure and the steam treatment time. The following prefoamed polystyrene particles listed in table 1 were prepared.

TABLE 1

Prefoamed polystyrene particles

| | Foamable polystyrene | | Prefoamed polystyrene |
|---|---|---|---|
| Filler | Starting material | Mean diameter [mm] | Bulk density [kg/m$^3$] |
| 1 | Neopor N2400 ® | 0.5-0.8 | 60 |
| 2 | Neopor N2200 ® | 1.4-2.5 | 60 |
| 3 | Styropor P426 ® | 0.4-0.7 | 54 |
| 4 | Example A1.2 | 0.4-0.7 | 50 |
| 5 | Neopor N2400 ® | 0.5-0.8 | 10 |

A3) Preparation of Milled Polystyrene

A3.1) Extruded Polystyrene Foams (Filler 6)

Extruded PS foam available from BASF as Styrodur® (bulk density about 30 kg/m$^3$) was milled in a Pallmann impact mill type PP to a mean particle diameter of from 0.2 to 2 mm.

A3.2) Polyurethane Foam (Filler 7):

Recycled, commercially available polyurethane foam for insulations, having a size of 9 cm×40 cm×70 cm and a density of 33 kg/m$^3$, was milled in a Retsch SM2000 cutting mill to a mean particle diameter of from 0.2 to 2 mm.

B) Production of the wood-base materials

B1) Wood-Base Material According to US 2005/0019548

The properties disclosed in US 2005/0019548 are summarized in table 2 (examples 1 to 3).

B2) Wood-Base Material According to JP 06031708

The properties disclosed in JP 06031708 are summarized in table 2 (examples 4 and 5).

B3) Wood-Base Materials with and without Fillers

B3.1) Mixing of the Starting Materials 450 g of chips or fibers according to table 2 and, if appropriate, fillers according to table 2 are mixed in a mixer. Thereafter, 58.8 g of a glue liquor comprising 100 parts of Kaurit® glue 340 and 4 parts of a 52% aqueous ammonium nitrate solution and 10 parts of water were applied.

B3.2) Molding of the Glue-Treated Chips or Fibers

The glue-treated chips or fibers were precompacted in a 30×30 cm mold at room temperature. Thereafter, pressing was effected in a hot press (pressing temperature 190° C., pressing time 210 s). The required thickness of the board was 16 mm in each case.

C) Investigation of the Wood-Base Materials

C1) Density

The determination of the density was effected 24 hours after production according to EN 1058.

C2) Transverse Tensile Strength

The determination of the transverse tensile strength is effected according to EN 319.

C3) Swelling Values and Water Absorption

The determination of the swelling values and of the water absorption was effected according to DIN EN 317.

TABLE 2

Light wood-base material

| Example | Filler | Timbers; density [kg/m$^3$] | Density of material [kg/m$^3$] | Transverse tensile strength [N/mm$^2$] | Water absorption [%] | Swelling values [%] |
|---|---|---|---|---|---|---|
| 1 | Dualite 7020 | Wood flakes; not mentioned | 622 | 0.47 | — | — |
| 2 | Dualite 6001 | Wood flakes; not mentioned | 617 | 0.39 | — | — |
| 3 | Glass S22 | Wood flakes; not mentioned | 607 | 0.31 | — | — |
| 4 | 10% of polystyrene filler (particle diameter = 3 to 5 mm; bulk density = 50 kg/m$^3$) | Japanese cedar; 340 to 440 | 430 | 0.46 | — | — |
| 5 | 20% of polystyrene filler (particle diameter = 3 to 5 mm; bulk density = 50 kg/m$^3$) | Japanese cedar; 340 to 440 | 430 | 0.48 | — | — |
| 6* PB | 5%[1] of filler 2 | Spruce; about 450 | 500 | 0.51 | 118.1 | 17.4 |
| 7* PB | 10% of filler 1 | Spruce; about 450 | 500 | 0.61 | 101.9 | 13.1 |
| 8* PB | 10% of filler 2 | Spruce; about 450 | 451 | 0.51 | 119.5 | 13.8 |
| 9* PB | 10% of filler 1 | Spruce; about 450 | 433 | 0.46 | 130.5 | 12.8 |
| 10* PB | 15% of filler 3 | Spruce; about 450 | 473 | 0.75 | 95.4 | 15.0 |
| 11* PB | 15% of filler 3 | Spruce; about 450 | 335 | 0.34 | 110.7 | 6.9 |
| 12* Fiber-board | 10% of filler 1 | Spruce; about 450 | 421 | 0.49 | 134.7 | 11.2 |
| 13* Fiber-board | 15% of filler 1 | Spruce; about 450 | 378 | 0.52 | 143.8 | 10.0 |
| 14 | 10% of filler 4 | A homogeneous board could not be produced. | | | | |
| 15 | 10% of filler 5 | The board broke apart on precompaction. | | | | |
| 16 | 10% of filler 6 | Spruce; about 450 | 510 | 0.35 | 120.4 | 21.0 |
| 17 | 10% of filler 7 | Spruce; about 450 | 513 | 0.19 | 143.5 | 27.9 |
| 18 | No filler | Spruce; about 450 | 513 | 0.26 | 130.6 | 20.6 |

*= according to the invention

[1]= the stated weight is based on the wood particles.

We claim:

1. A light wood-base material comprising from 30 to 92.5% by weight, based on the wood-base material, of wood particles, the wood particles having a mean density of from 0.4 to 0.85 g/cm$^3$, from 2.5 to 20% by weight, based on the wood-base material, of polystyrene and/or of styrene copolymer as a filler, the filler having a bulk density of from 10 to 100 kg/m$^3$, and from 5 to 50% by weight, based on the wood-base material, of a binder, the mean density of the light wood-base material being less than or equal to 600 kg/m$^3$.

2. The light wood-base material according to claim 1, wherein the filler is prefoamed filler beads or spheres which have a diameter of from 0.25 to 10 mm.

3. The light wood-base material according to claim 2, wherein the filler beads or spheres having an antistatic coating.

4. The light wood-base material according to claim 1, wherein the wood particles having a mean density of from 0.4 to 0.75 g/cm$^3$.

5. The light wood-base material according to claim 3, wherein the wood particles having a mean density of from 0.4 to 0.6 g/cm$^3$.

6. The light wood-base material according to claim 1, wherein the transverse tensile strength of the wood-base material being greater than 0.4 N/mm$^2$.

7. The light wood-base material according to claim 5, wherein the transverse tensile strength of the wood-base material being greater than 0.6 N/mm$^2$.

8. The light wood-base material according to claim 1, wherein the density of the wood-base material being from 250 to 550 kg/m$^3$.

9. The light wood-base material according to claim 7, wherein the density of the wood-base material being from 300 to 500 kg/m$^3$.

10. The light wood-base material according to claim 1, comprising from 55 to 92.5% by weight, based on the wood-base material, of wood particles, the wood particles having a mean density of from 0.4 to 0.6 $g/cm^3$, and from 5 to 15% by weight, based on the wood-base material, of polystyrene and/or of styrene copolymer as a filler, the filler having a bulk density of from 15 to 80 $kg/m^3$, and from 2.5 to 40% by weight, based on the wood-base material, of a binder, the mean density of the light wood-base material being less than or equal to 550 $kg/m^3$.

11. A composite material which comprises at least three wood-base material layers, the middle layer(s) comprising wood-base materials according to claim 1 and the outer layers comprising no filler.

12. A composite material which comprises at least three wood-base material layers, the middle layer(s) comprising wood-base materials according to claim 9 and the outer layers comprising no filler.

13. Furniture, furniture parts or packaging materials, in house construction or interior trim which comprises the light wood-containing material as claimed in claim 4.

* * * * *